(12) United States Patent
Nair et al.

(10) Patent No.: US 11,057,766 B2
(45) Date of Patent: Jul. 6, 2021

(54) SECURITY MANAGEMENT IN DISAGGREGATED BASE STATION IN COMMUNICATION SYSTEM

(71) Applicant: Nokia Technologies Oy, Espoo (FI)

(72) Inventors: Suresh P. Nair, Whippany, NJ (US); Tsunehiko Chiba, Saitama (JP); Philippe Godin, Versailles (FR)

(73) Assignee: Nokia Technologies Oy, Espoo (FI)

( * ) Notice: Subject to any disclaimer, the term of this patent is extended or adjusted under 35 U.S.C. 154(b) by 153 days.

(21) Appl. No.: 16/178,266

(22) Filed: Nov. 1, 2018

(65) Prior Publication Data
US 2020/0145819 A1 May 7, 2020

(51) Int. Cl.
| | | |
|---|---|---|
| *H04W 12/04* | (2021.01) | |
| *H04W 12/10* | (2021.01) | |
| *H04W 92/10* | (2009.01) | |
| *H04W 12/041* | (2021.01) | |
| *H04W 12/60* | (2021.01) | |

(52) U.S. Cl.
CPC ............ *H04W 12/04* (2013.01); *H04W 12/10* (2013.01); *H04W 92/10* (2013.01)

(58) Field of Classification Search
CPC ..... H04W 12/04; H04W 12/10; H04W 92/10; H04W 12/005; H04W 12/0401
See application file for complete search history.

(56) References Cited

U.S. PATENT DOCUMENTS

| | | | |
|---|---|---|---|
| 9,479,487 B2 | 10/2016 | Nair et al. | |
| 2010/0166184 A1* | 7/2010 | Wu | .................... H04W 12/0401 380/270 |
| 2012/0039472 A1* | 2/2012 | Liu | .................... H04W 12/0401 380/270 |
| 2012/0155428 A1* | 6/2012 | Bovo | ................ H04W 12/0401 370/331 |
| 2012/0278869 A1* | 11/2012 | Guccione | .............. H04L 63/102 726/5 |

(Continued)

FOREIGN PATENT DOCUMENTS

WO WO-2019158117 A1 * 8/2019 ............... H04L 9/08

OTHER PUBLICATIONS

3GPP, "3rd Generation Partnership Project; Technical Specification Group Radio Access Network; NG-RAN; Architecture Description (Release 15)," 3GPP TS 38.401, V15.3.0, Sep. 2018, 39 pages.

(Continued)

*Primary Examiner* — Darren B Schwartz

(74) *Attorney, Agent, or Firm* — Ryan, Mason & Lewis, LLP

(57) ABSTRACT

A reconfiguration message is received at user equipment in a communication system from a disaggregated base station with which the user equipment has a current security context established. The reconfiguration message comprises an instruction to compute a new security context based on a security domain counter value, wherein the security domain counter value represents a given security domain from a plurality of security domains supported by the disaggregated base station. The new security context is computed at the user equipment for the given security domain based on the security domain counter value. A set of security keys are derived from the new security context at the user equipment.

26 Claims, 6 Drawing Sheets

(56) References Cited

U.S. PATENT DOCUMENTS

| | | | | |
|---|---|---|---|---|
| 2012/0294444 | A1* | 11/2012 | Feng | H04L 63/06 380/270 |
| 2013/0077785 | A1* | 3/2013 | Feng | H04W 12/0431 380/44 |
| 2013/0155948 | A1* | 6/2013 | Pinheiro | H04W 76/10 370/328 |
| 2015/0163202 | A1* | 6/2015 | Nair | H04W 12/001 726/2 |
| 2016/0029213 | A1* | 1/2016 | Rajadurai | H04W 76/16 380/283 |
| 2017/0289797 | A1* | 10/2017 | Bae | H04W 12/041 |
| 2018/0006809 | A1* | 1/2018 | Scarlata | H04L 9/0816 |
| 2018/0376330 | A1* | 12/2018 | Basu Mallick | H04W 12/0401 |
| 2019/0149997 | A1* | 5/2019 | Liao | H04W 12/1202 455/411 |
| 2019/0320352 | A1* | 10/2019 | Lee | H04W 12/0401 |
| 2020/0015088 | A1* | 1/2020 | Luo | H04L 9/08 |
| 2020/0120572 | A1* | 4/2020 | Fiorani | H04W 36/38 |

OTHER PUBLICATIONS

3GPP, "3rd Generation Partnership Project; Technical Specification Group Services and System Aspects; Security and Architecture Procedures for 5G System (Release 15)," 3GPP TS 33.501, V15.1.0, Jun. 2018, 152 pages.

3GPP, "3rd Generation Partnership Project; Technical Specification Group Services and System Aspects; 3GPP System Architecture Evolution (SAE); Security Architecture (Release 15)," 3GPP TS 33.401, V15.5.0, Sep. 2018, 163 pages.

3GPP, "3rd Generation Partnership Project; Technical Specification Group Services and System Aspects; System Architecture for the 5G System; Stage 2 (Release 15)," 3GPP TS 23.501, V15.2.0, Jun. 2018, 217 pages.

3GPP, "3rd Generation Partnership Project; Technical Specification Group Services and System Aspects; Study on the Security Aspects of the Next Generation System (Release 14)," 3GPP TR 33.899, V1.3.0, Aug. 2017, 605 pages.

* cited by examiner

SECURITY MANAGEMENT IN DISAGGREGATED BASE STATION IN COMMUNICATION SYSTEM

FIELD

The field relates generally to communication systems, and more particularly, but not exclusively, to security management within such systems.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network. The access point (e.g., gNB) is illustratively part of an access network of the communication system. For example, in a 5G network, the access network is referred to as a 5G System and is described in 5G Technical Specification (TS) 23.501, V15.2.0, entitled "Technical Specification Group Services and System Aspects; System Architecture for the 5G System," the disclosure of which is incorporated by reference herein in its entirety. In general, the access point (e.g., gNB) provides access for the UE to a core network (CN), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, V15.1.0, entitled "Technical Specification Group Services and System Aspects; Security Architecture and Procedures for the 5G System" and 5G Technical Report (TR) 33.899, V1.3.0, entitled Technical Specification Group Services and System Aspects; Study on the Security Aspects of the Next Generation System," the disclosures of which are incorporated by reference herein in their entireties, further describe security management details associated with a 5G network.

Security management is an important consideration in any communication system. For example, access stratum (AS) key management between a UE and a gNB is an important but challenging task.

SUMMARY

Illustrative embodiments provide improved techniques for security management in communication systems particularly between user equipment and a disaggregated base station.

For example, in one illustrative embodiment, a method comprises the following steps. A reconfiguration message is received at user equipment in a communication system from a disaggregated base station with which the user equipment has a current security context established. The reconfiguration message comprises an instruction to compute a new security context based on a security domain counter value, wherein the security domain counter value represents a given security domain from a plurality of security domains supported by the disaggregated base station. The new security context is computed at the user equipment for the given security domain based on the security domain counter value. A set of security keys are derived from the new security context at the user equipment.

In another illustrative embodiment, a method comprises sending a reconfiguration message from a disaggregated base station in a communication system to user equipment with which the disaggregated base station has a current security context established. The reconfiguration message comprises an instruction to the user equipment to compute a new security context based on a security domain counter value, wherein the security domain counter value represents a given security domain from a plurality of security domains supported by the disaggregated base station. The method, in one or more illustrative embodiments, also computes a plurality of sets of security keys respectively for the plurality of security domains, wherein one or more of the computations are based on the security domain counter value.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

DETAILED DESCRIPTION

Figure 1:
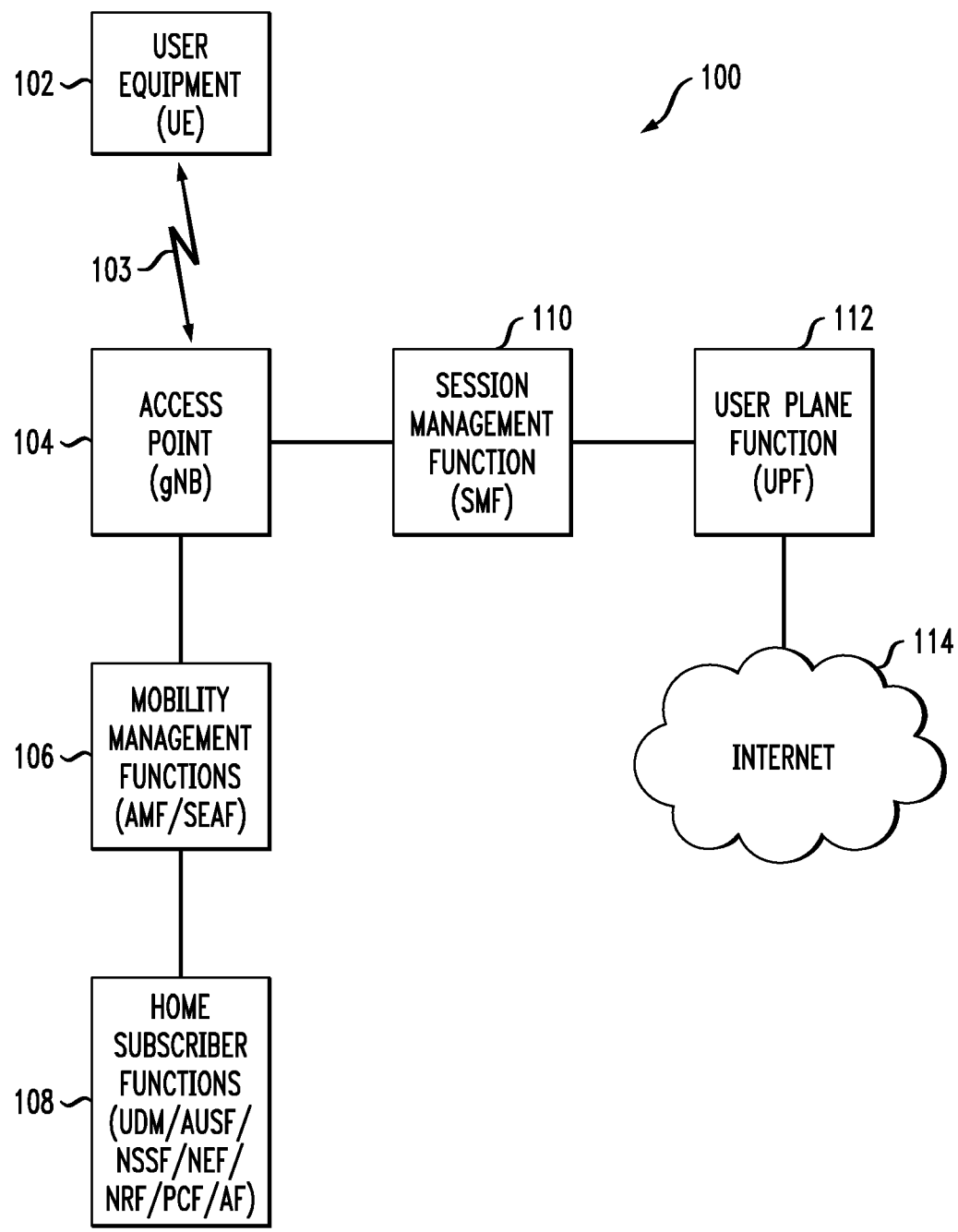
FIG. 1 illustrates a communication system with which one or more illustrative embodiments are implemented.

Embodiments will be illustrated herein in conjunction with exemplary communication systems and associated techniques for providing security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) provide further explanation of user equipment and network elements/functions and/or operations that interact with one or more illustrative embodiments, e.g., the above-referenced 3GPP TS 23.501, 3GPP TS 33.501, and 3GPP TR 33.899. Other 3GPP TS/TR documents provide other conventional details that one of ordinary skill in the art will realize. However, while illustrative embodiments are well-suited for implementation associated with the above-mentioned 5G-related 3GPP standards, alternative embodiments are not necessarily intended to be limited to any particular standards.

Furthermore, illustrative embodiments will be explained herein in the context of the Open Systems Interconnection model (OSI model) which is a model that conceptually characterizes communication functions of a communication system such as, for example, a 5G network. The OSI model is typically conceptualized as a hierarchical stack with a given layer serving the layer above and being served by the layer below. Typically, the OSI model comprises seven layers with the top layer of the stack being the application layer (layer 7) followed by the presentation layer (layer 6), the session layer (layer 5), the transport layer (layer 4), the network layer (layer 3), the data link layer (layer 2), and the physical layer (layer 1). One of ordinary skill in the art will appreciate the functions and interworkings of the various layers and, thus, further details of each layer are not described herein. However, it is to be appreciated that while illustrative embodiments are well-suited for implementations that utilize an OSI model, alternative embodiments are not necessarily limited to any particular communication function model.

Illustrative embodiments are related to security management associated with the Service-Based Architecture (SBA) for 5G networks. Prior to describing such illustrative embodiments, a general description of main components of a 5G network will be described below in the context of FIGS. 1 and 2.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements are used in other embodiments to implement some or all of the main functions represented. Also, it is to be understood that not all functions of a 5G network are depicted in FIG. 1. Rather, functions that facilitate an explanation of illustrative embodiments are represented. Subsequent figures depict some additional elements/functions.

Accordingly, as shown, communication system 100 comprises user equipment (UE) 102 that communicates via an air interface 103 with an access point (gNB) 104. The UE 102 in some embodiments is a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone or other cellular device. In one or more illustrative embodiments, user equipment refers to an IoT device and/or a device that executes ultra-reliable low latency communication (URLLC) application software where computing resources on the UE are limited or performance and timing requirements are very stringent. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores the permanent subscription identifier and its related key, which are used to identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as a Subscription Concealed Identifier (SUCI).

The access point 104 is illustratively part of an access network of the communication system 100. Such an access network comprises, for example, a 5G System having a plurality of base stations and one or more associated radio network control functions. The base stations and radio network control functions in some embodiments are logically separate entities, but in some embodiments are implemented in the same physical network element, such as, for example, a base station router or femto cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) in some embodiments is also implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF is also referred to herein, more generally, as an access and mobility management entity.

The AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) are also referred to herein, more generally, as an authentication entity. In addition, home subscriber functions include, but are not limited to, Network Slice Selection Function (NSSF), Network Exposure Function (NEF), Network Repository Function (NRF), Policy Control Function (PCF), and Application Function (AF).

One important point to note is that in an SBA communication system, such as a 5G system, the control plane uses a services model approach in which components (NFs) query the NRF to discover and communicate with each other over application programming interfaces (APIs). The NF services discovery and authorization method will be described in further detail below.

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. As is known in 5G and other communication networks, the user plane (UP) or data plane carries network user traffic while the control plane (CP) carries signaling traffic. SMF 110 supports functionalities relating to UP subscriber sessions, e.g., establishment, modification and release of Protocol Data Unit (PDU) sessions. UPF 112 supports functionalities to facilitate UP operations, e.g., packet routing and forwarding, interconnection to the data network (e.g., 114 in FIG. 1), policy enforcement, and data buffering.

It is to be appreciated that FIG. 1 is a simplified illustration in that not all communication links and connections between NFs and other system elements are illustrated in FIG. 1. One ordinarily skilled in the art given the various 3GPP TSs/TRs will appreciate the various links and connections not expressly shown or that may otherwise be generalized in FIG. 1.

Further typical operations and functions of certain network elements are not described herein in detail when they are not the focus of illustrative embodiments but can be found in appropriate 3GPP 5G documentation. It is to be appreciated that the particular arrangement of system elements in FIG. 1 is an example only, and other types and arrangements of additional or alternative elements can be used to implement a communication system in other embodiments. For example, in other embodiments, the system 100 comprises other elements/functions not expressly shown herein. Also, although only single elements/functions are shown in the FIG. 1 embodiment, this is for simplicity and clarity of illustration only. A given alternative embodiment may include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104. NFs can also access services of other NFs.

Figure 2:
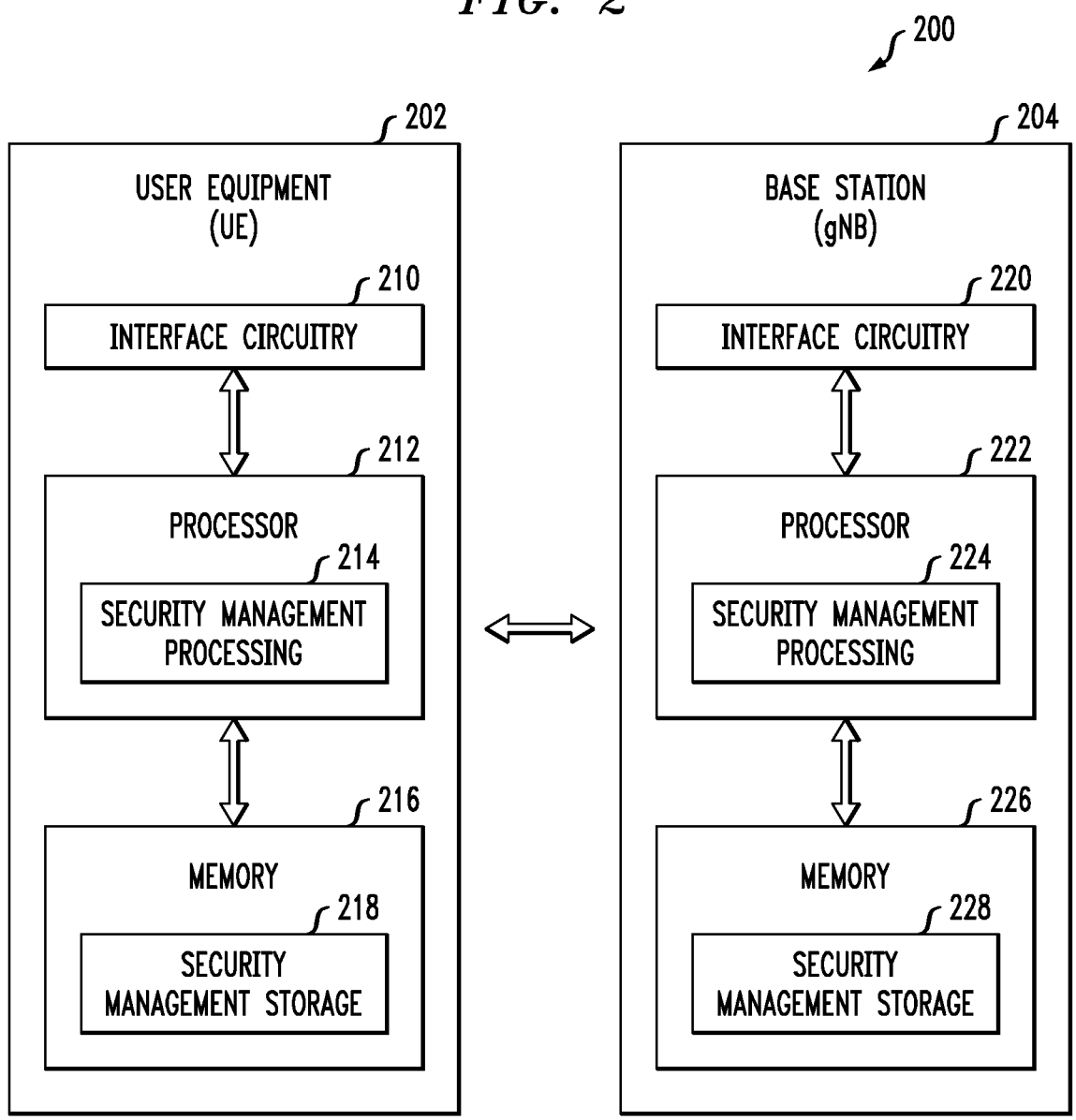
FIG. 2 illustrates user equipment and a base station configured for providing security management with which one or more illustrative embodiments are implemented.

FIG. 2 is a block diagram of user equipment and a base station configured for providing security management in an illustrative embodiment. More particularly, system 200 is shown comprising user equipment 202 and a base station 204.

The user equipment 202 comprises a processor 212 coupled to a memory 216 and interface circuitry 210. The processor 212 of the user equipment 202 includes a security management processing module 214 that may be implemented at least in part in the form of software executed by the processor. The processing module 214 performs security management described in conjunction with FIG. 3 below and otherwise herein. The memory 216 of the user equipment 202 includes a security management storage module 218 that stores data generated or otherwise used during security management operations.

The base station 204 comprises a processor 222 coupled to a memory 226 and interface circuitry 220. The processor 222 of the base station 204 includes a security management processing module 224 that may be implemented at least in part in the form of software executed by the processor 222. The processing module 224 performs security management described in conjunction with FIG. 3 below and otherwise herein. The memory 226 of the base station 204 includes a security management storage module 228 that stores data generated or otherwise used during security management operations.

The respective processors 212 and 222 of user equipment 202 and base station 204 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments.

The respective memories 216 and 226 of user equipment 202 and base station 204 may be used to store one or more software programs that are executed by the respective processors 212 and 222 to implement at least a portion of the functionality described herein. For example, security management operations and other functionality as described in conjunction with FIG. 3 below and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The respective interface circuitries 210 and 220 of user equipment 202 and base station 204 illustratively comprise transceivers or other communication hardware or firmware that allows the associated system elements to communicate with one another in the manner described herein.

It is apparent from FIG. 2 that user equipment 202 is configured for communication with base station 204 and vice-versa via their respective interface circuitries 210 and 220. This communication involves user equipment 202 sending data to the base station 204, and base station 204 sending data to user equipment 202. However, in alternative embodiments, other network elements may be operatively coupled between, as well as to, user equipment 202 and base station 204. The term "data" as used herein is intended to be construed broadly, so as to encompass any type of information that may be sent between user equipment and a base station including, but not limited to, messages, tokens, identifiers, keys, indicators, user data, control data, etc.

It is to be appreciated that the particular arrangement of components shown in FIG. 2 is an example only, and numerous alternative configurations are used in other embodiments. For example, user equipment and base stations can be configured to incorporate additional or alternative components and to support other communication protocols.

Other elements in a 5G network may each also be configured to include components such as a processor, memory and network interface. These elements need not be implemented on separate stand-alone processing platforms, but could instead, for example, represent different functional portions of a single common processing platform.

As mentioned above, access stratum key management between a UE and a gNB is an important but challenging task. The access stratum or AS is a functional layer in a 5G system between the radio access network (RAN, of which the gNB is a part) and user equipment (UE) responsible for transporting data over the wireless connection between the gNB and UE and for managing radio resources. Contrast the AS with the non-access stratum (NAS) functional layer. NAS is the functional layer between the TIE and the core network (e.g., mobility management function, etc.).

In 5G, to support Cloud RAN (or C-RAN which is a cloud computing-based architecture for radio access networks) implementations, the base station (gNB) is disaggregated (split) into multiple Distributed Units (DU) and a Centralized Unit (CU). The CU is further split into two entities, Control Plane (GU-CP) and User Plane (CU-UP). The CU-CP supports Radio Resource Control (RRC) of the gNB, and CU-UP supports the Packet Data Convergence Protocol (PDCP) entity. The next generation (NG) RAN architecture and functional split is specified in 5G Technical Specification (TS) 38.401, V15.3.0, entitled "Technical Specification Group Radio Access Network; NG-RAN; Architecture Description," the disclosure of which is incorporated by reference herein in its entirety.

Figure 3:
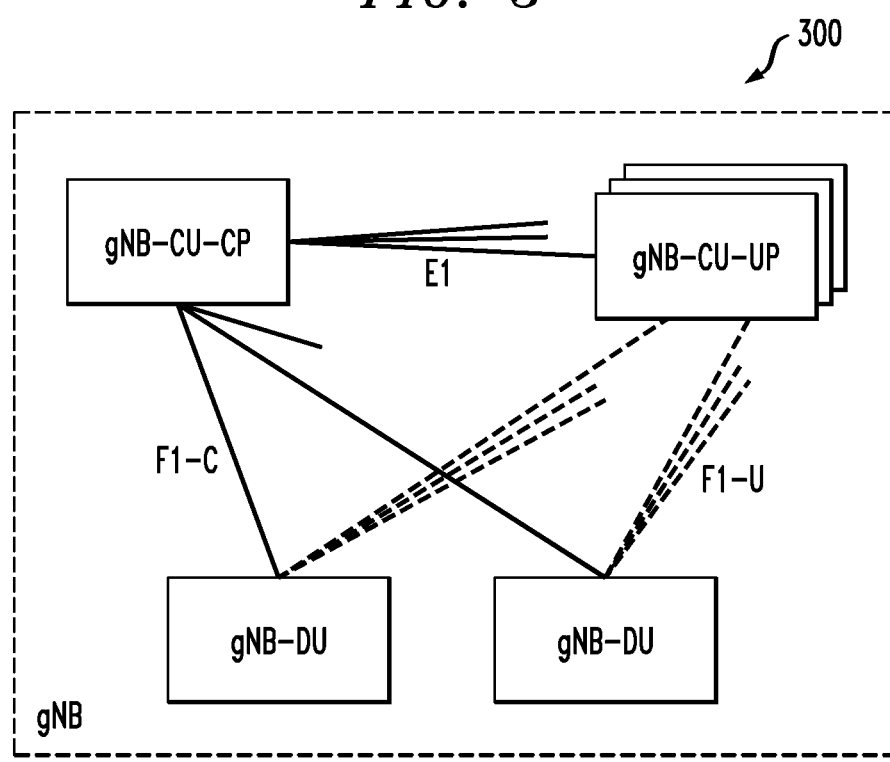
FIG. 3 illustrates an overall architecture for a disaggregated base station in a communication system with which one or more illustrative embodiments are implemented.

FIG. 3 illustrates an overall architecture from TS 38.401 of a disaggregated base station. More particularly, the architecture in FIG. 3 illustrates a gNB 300 wherein:

gNB consists of a gNB-CU-CP (Centralized Unit-Control Plane component), multiple gNB-CU-UPs (Centralized Unit-User Plane components) and multiple gNB-DUs (Distributed Units);

gNB-CU-CP is connected to the gNB-DU through the F1-C interface;

gNB-CU-UP is connected to the gNB-DU through the F1-U interface;

gNB-CU-UP is connected to the gNB-CU-CP through the E1 interface;

One gNB-DU is connected to only one gNB-CU-CP; and

One gNB-CU-UP is connected to only one gNB-CU-CP.

For resiliency, a gNB-DU and/or a gNB-CU-UP may be connected to multiple gNB-CU-CPs by appropriate implementation.

One gNB-DU can be connected to multiple gNB-CU-UPs under the control of the same gNB-CU-CP.

One gNB-CU-UP can be connected to multiple DUs under the control of the same gNB-CU-CP.

The connectivity between a gNB-CU-UP and a gNB-DU is established by the gNB-CU-CP using Bearer Context Management functions.

The gNB-CU-CP selects the appropriate gNB-CU-UP(s) for e requested services for the UE.

Data forwarding between gNB-CU-UPs during intra-gNB-CU-CP handover within a gNB may be supported by Xn-U.

Further details regarding the components and interfaces are described in TS 38.401.

In 3GPP Rel-15, the assumption is that all DUs and CU-UPs involved with a connected UE are in the same security domain (same UP-encryption key). However, it is realized in accordance with illustrative embodiments that, in future deployments, a single UE (such as, e.g., a smart phone) may invoke multiple applications simultaneously, for example, a best effort data application, a voice application, a URLLC application and an IoT application. Since the quality-of-service (QoS) and latency requirements for these applications are different, it is possible that the UE may establish connection with multiple DUs to establish appropriate Radio Bearers (RB), N3 connection to UPF, and Next Generation Application Protocol (NGAP) links. The Radio Bearer for a URLLC application may be connected to a DU and its corresponding CU-UP may be placed close to the DU to minimize transmission delays. Hence, illustrative embodiments realize that multiple CU-UPs optimized for particular applications and service characteristics may not always be located in the same security domain.

Thus, it is realized in accordance with illustrative embodiments that the CU-CP, which manages the instantiation and assignment of Radio Bearers on different DUs and CU-UPs, needs a new security framework to manage the security of the CU-UP instances which get terminated in different security domains, although still under the control of the same CU-CP and logical gNB. Without such a new security framework, the UP-encryption key in different security domains will be same. If the same keys are used in different security domains, any false agent will be able to decrypt or manipulate data in another domain, hence losing privacy and security isolation.

Accordingly, one or more illustrative embodiments derive different UP encryption keys ($K_{UPenc}$) and UP integrity keys ($K_{UPint}$), when the CU-UP entities are instantiated in different security domains. To achieve this, dual connectivity principles are adapted within a logical gNB to achieve the key separation.

Figure 4:
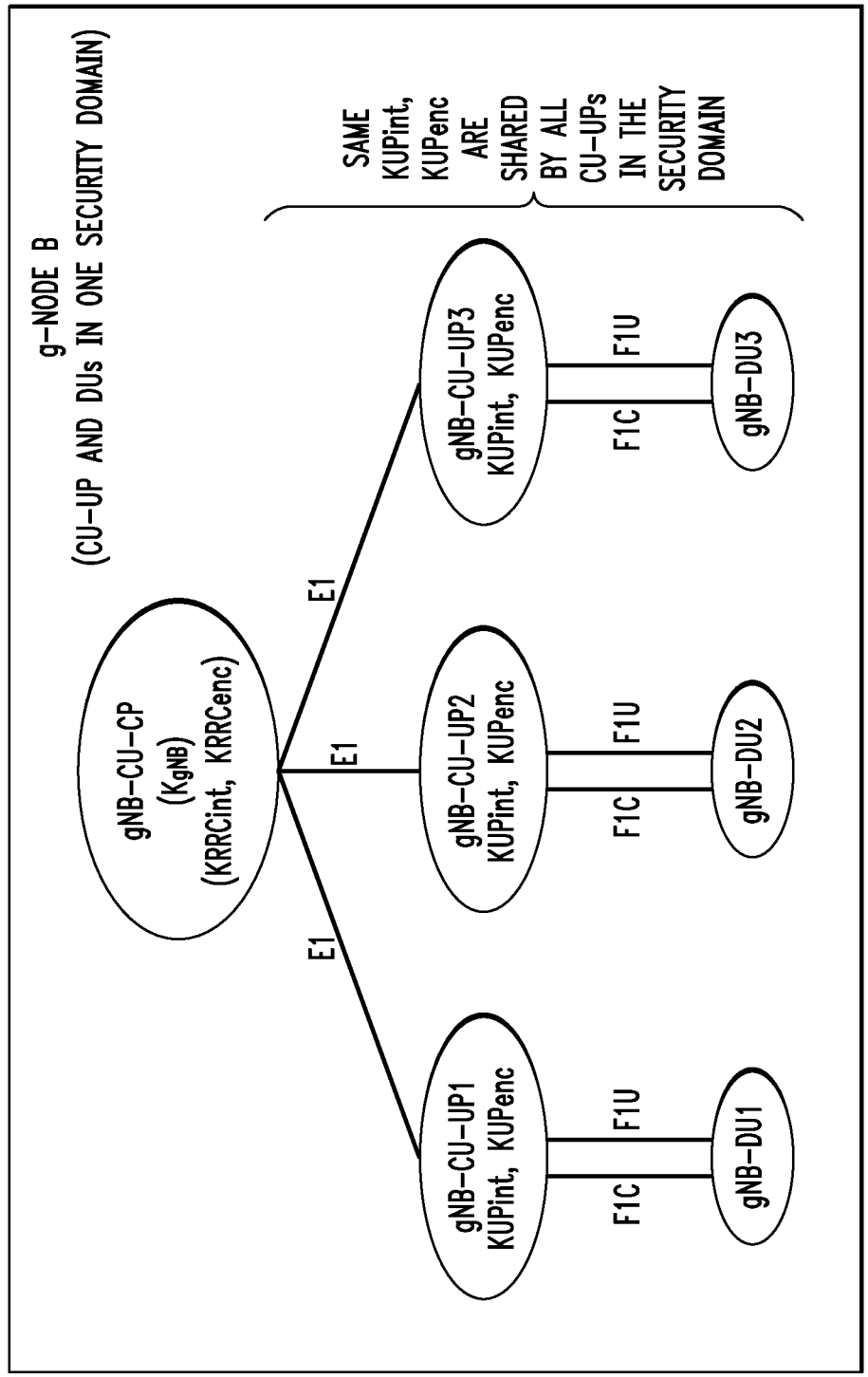
FIG. 4 illustrates an access stratum key hierarchy for a disaggregated base station supporting only one set of keys for user equipment connection.

Before illustrating the inventive solution, FIG. 4 depicts a current AS key hierarchy 400 wherein only one set of keys is generated for all CU-UPs involved in UE connection. Note how, for a given gNB, the same UP encryption key ($K_{UPenc}$) and UP integrity key ($K_{UPint}$) are shared by all CU-UPs (gNB-CU-UP1, gNB-CU-UP2, gNB-CU-UP3) in the security domain.

Figure 5:
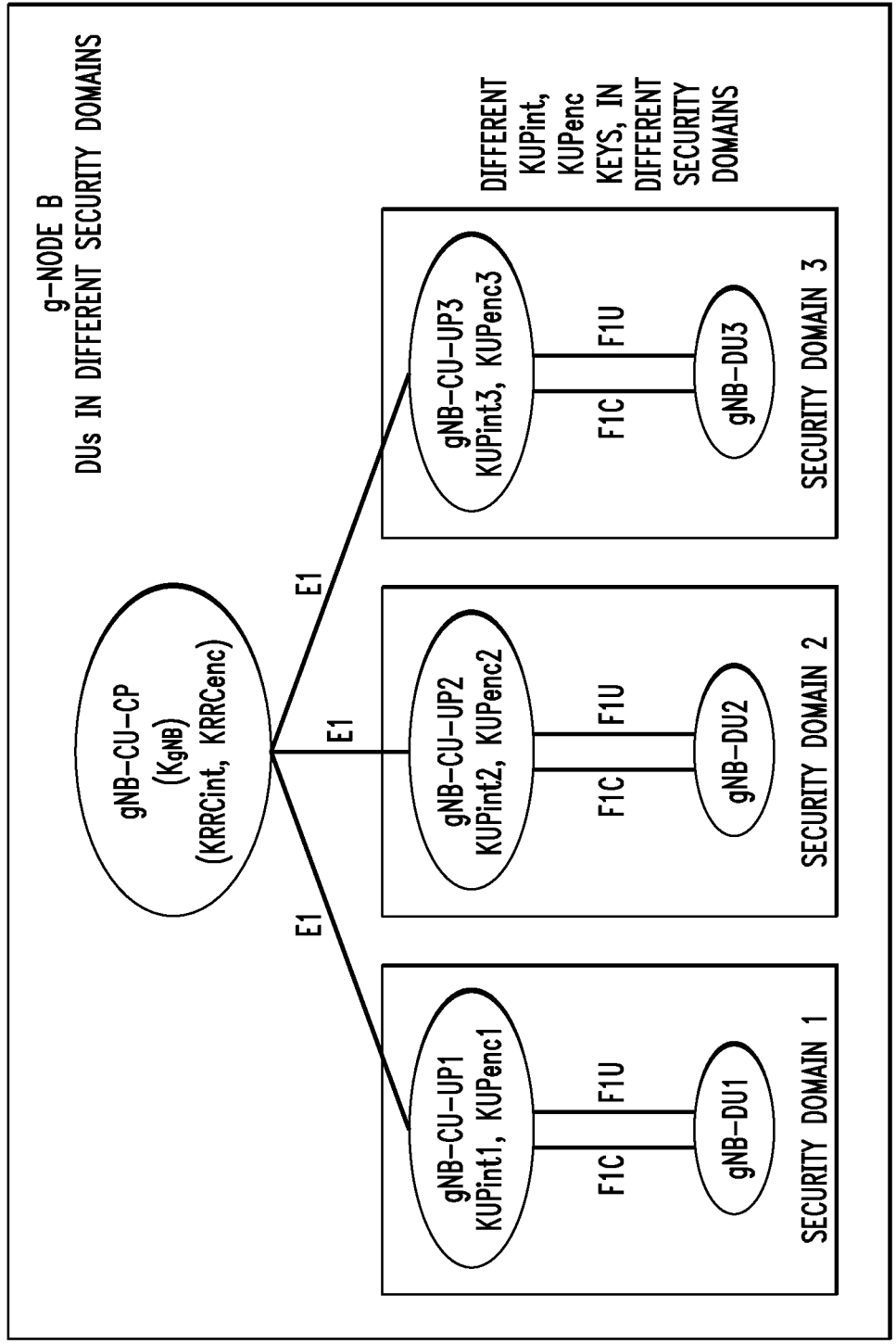
FIG. 5 illustrates an access stratum key hierarchy for a disaggregated base supporting multiple security domains according to an illustrative embodiment.

FIG. 5 illustrates an AS key hierarchy 500 supporting multiple security domains according to an illustrative embodiment. Note how, for a given gNB, different UP encryption keys ($K_{UPenc}$) and UP integrity keys ($K_{UPint}$) are generated for each of the CU-UPs (gNB-CU-UP 1, gNB-CU-UP2, gNB-CU-UP3) for each of the multiple security domains. Thus, $K_{UPenc1}$ and $K_{UPint1}$ are generated for gNB-CU-UP1 in security domain 1, $K_{UPenc2}$ and $K_{UPint2}$ are generated for gNB-CU-UP2 in security domain 2, and $K_{UPenc3}$ and $K_{UPint3}$ are generated for gNB-CU-UP3 in security domain 3.

In one or more illustrative embodiments, if CU-UPs and DUs are in different security domains, for the same Data Radio Bearer identifier (DRB id) space belonging to the gNB, the following steps occur:

1) The CU-CP computes fresh KgNBs (new security contexts) for the new security domains (as in the case, for example, of dual connectivity) using a 'security domain counter' parameter along with the current default KgNB, as shown below:

$KgNB_{Security\ domain1}$=KgNB (i.e., Current value of KgNB)

$KgNB_{Security\ domain2}$=KDF(KgNB, Security domain counter=2)

$KgNB_{Security\ domain3}$=KDF (KgNB, Security domain counter=3)

where KDF is the Key Derivation Function.

'Security domain counter' is stored in the AS security context for the UE.

2) From the computed $KgNB_{Security\ domain}$ value, CU-CP further derives the UP keys, i.e., $K_{UPenc}$ for encryption/decryption of DL/UL data, $K_{UPint}$ for the integrity message authentication code (MAC) calculation and verification for the DL/UL data, in the corresponding security domain.

3) The CU-CP sends the derived UP keys to the corresponding CU-UP for use, while instantiating Radio Bearers in those security domains. In some embodiments, CU-CP also sends the corresponding security domain ID for further checking by CU-UP.

Figure 6:
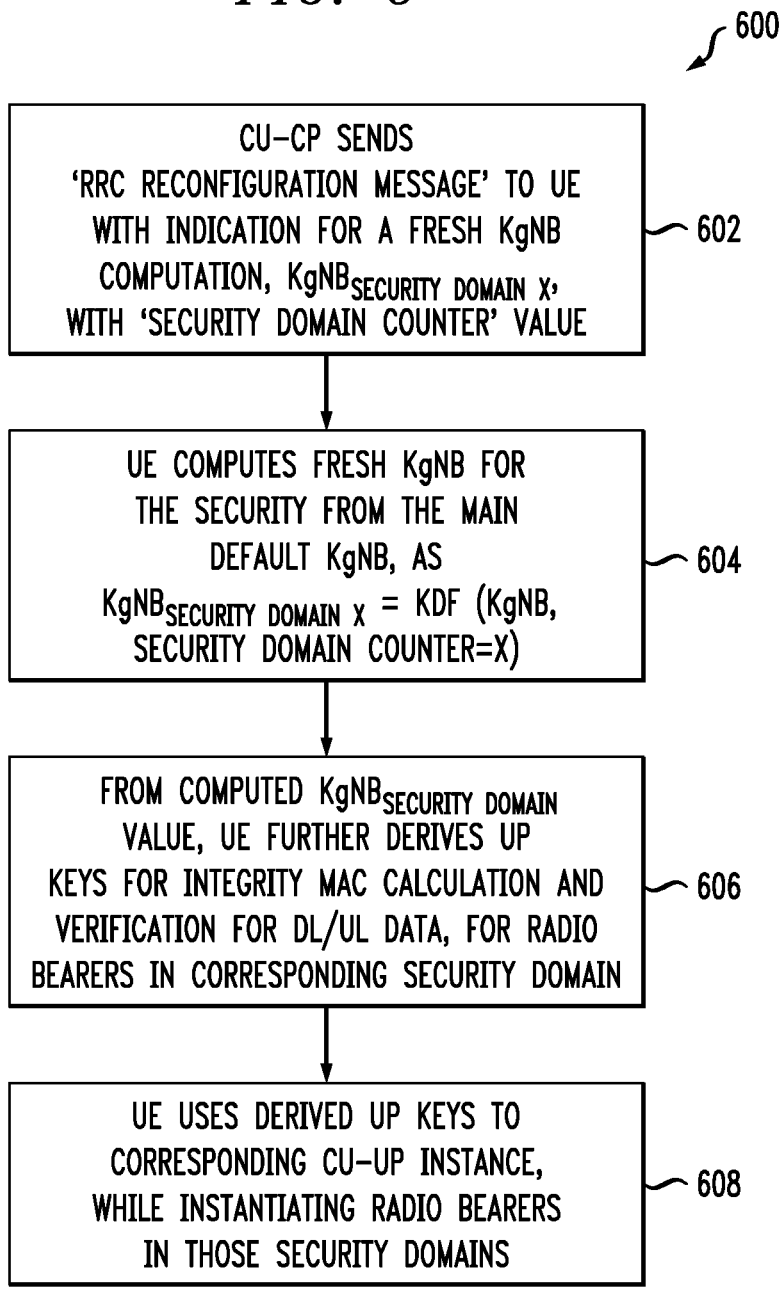
FIG. 6 illustrates a message flow between user equipment and a disaggregated base station supporting multiple security domains according to an illustrative embodiment.

FIG. 6 illustrates a message flow 600 between user equipment and a disaggregated base station supporting multiple security domains according to an illustrative embodiment.

Step 602: To instruct the UE for using a new set of keys for a new security domain, the CU-CP in the 'RRC RECONFIGURATION MESSAGE' used to add the particular Radio Bearer, adds an indication for a fresh KgNB computation, $KgNB_{Security\ domain\ X}$ with a new 'security domain counter' value.

Step 604: Upon receiving the indication, the UE computes a fresh KgNB for the security from the main default KgNB (current security context), as $KgNB_{Security\ domain\ X}$=KDF (KgNB, Security domain counter=X).

Step 606: From the computed $KgNB_{Security\ domain}$ value, UE further derives the UP keys, i.e., $K_{UPenc}$ for encryption/decryption of DL/UL data, $K_{UPint}$ for the integrity MAC calculation and verification for the DL/UL data, for the radio bearers in the corresponding security domain.

Step 608: The UE uses the derived keys $K_{UPenc}$ and $K_{UPint}$ for the corresponding CU-UP instance, while instantiating Radio Bearers in those security domains.

The particular processing operations and other system functionality described in conjunction with the figures are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should therefore again be emphasized that the various embodiments described herein are presented by way of illustrative example only and should not be construed as limiting the scope of the claims. For example, alternative embodiments can utilize different communication system configurations, user equipment configurations, base station configurations, key pair provisioning and usage processes, messaging protocols and message formats than those described above in the context of the illustrative embodiments. These and numerous other alternative embodiments within the scope of the appended claims will be readily apparent to those skilled in the art.

What is claimed is:

1. An apparatus comprising:
   at least one processor;
   at least one memory including computer program code;
   the at least one memory and the computer program code being configured to, with the at least one processor, cause user equipment in a communication system at least to:
   receive a reconfiguration message from a disaggregated base station with which the user equipment has a current security context established, wherein the reconfiguration message comprises an instruction to compute a new security context for one of a plurality of security domains supported by the disaggregated base station based on a security domain counter value, wherein the security domain counter value is associated with said one of the plurality of security domains supported by the disaggregated base station;
   compute the new security context for said one of the plurality of security domains based on the security domain counter value and a current default security context value for the disaggregated base station; and
   derive a set of security keys for said one of the plurality of security domains from the new security context.

2. The apparatus of claim 1, wherein each of the plurality of security domains corresponds to each of a plurality of centralized unit user plane (CU-UP) components in the disaggregated base station.

3. The apparatus of claim 1, wherein each of the plurality of security domains corresponds to each of a plurality of distributed unit (DU) components in the disaggregated base station.

4. The apparatus of claim 1, wherein each of the plurality of security domains correspond to a different application invoked by the user equipment.

5. The apparatus of claim 1, wherein the set of security keys comprise one or more user plane keys for said one of the plurality of security domains associated with the security domain counter value.

6. The apparatus of claim 5, wherein the one or more user plane keys comprise one or more of a user plane encryption key and a user plane integrity key for said one of the plurality of security domains associated with the security domain counter value.

7. The apparatus of claim 5, wherein the at least one memory and the computer program code are further configured to, with the at least one processor, cause the user equipment to use the derived one or more user plane keys while instantiating one or more radio bearers for said one of the plurality of security domains associated with the security domain counter value.

8. A method comprising:
receiving a reconfiguration message at user equipment in a communication system from a disaggregated base station with which the user equipment has a current security context established, wherein the reconfiguration message comprises an instruction to compute a new security context for one of a plurality of security domains supported by the disaggregated base station based on a security domain counter value, wherein the security domain counter value is associated with said one of the plurality of security domains supported by the disaggregated base station;
computing at the user equipment the new security context for said one of the plurality of security domains based on the security domain counter value and a current default security context value for the disaggregated base station; and
deriving a set of security keys for said one of the plurality of security domains from the new security context.

9. The method of claim 8, wherein each of the plurality of security domains corresponds to each of a plurality of centralized unit user plane (CU-UP) components in the disaggregated base station.

10. The method of claim 8, wherein each of the plurality of security domains corresponds to each of a plurality of distributed unit (DU) components in the disaggregated base station.

11. The method of claim 8, wherein each of the plurality of security domains correspond to a different application invoked by the user equipment.

12. The method of claim 8, wherein the set of security keys comprise one or more user plane keys for said one of the plurality of security domains associated with the security domain counter value.

13. The method of claim 12, wherein the one or more user plane keys comprise one or more of a user plane encryption key and a user plane integrity key for said one of the plurality of security domains associated with the security domain counter value.

14. The method of claim 12, further comprising the user equipment using the derived one or more user plane keys while instantiating one or more radio bearers for said one of the plurality of security domains associated with the security domain counter value.

15. An article of manufacture comprising a non-transitory computer-readable storage medium having embodied therein executable program code that when executed by a processor operatively coupled to the computer-readable storage medium causes the processor to perform the steps of claim 8.

16. An apparatus comprising:
at least one processor;
at least one memory including computer program code;
the at least one memory and the computer program code being configured to, with the at least one processor, cause a disaggregated base station in a communication system at least to:
send a reconfiguration message to user equipment with which the disaggregated base station has a current security context established, wherein the reconfiguration message comprises an instruction to the user equipment to compute a new security context for one of a plurality of security domains supported by the disaggregated base station based on a security domain counter value, wherein the security domain counter value is associated with said one of the plurality of security domains supported by the disaggregated base station; and
compute the new security context for said one of the plurality of security domains based on the security domain counter value and a current default security context value for the disaggregated base station.

17. The apparatus of claim 16, wherein the at least one memory and the computer program code are further configured to, with the at least one processor, cause the disaggregated base station to compute a plurality of sets of security keys respectively for the plurality of security domains, wherein computation of one of the plurality of sets of security keys for said one of the plurality of security domains is are based on the security domain counter value.

18. The apparatus of claim 17, wherein the at least one memory and the computer program code are further configured to, with the at least one processor, cause the disaggregated base station to send a different one of the plurality of sets of security keys respectively computed for the plurality of security domains to each of a plurality of centralized unit user plane (CU-UP) components of the disaggregated base station.

19. The apparatus of claim 18, wherein the at least one memory and the computer program code are further configured to, with the at least one processor, cause the disaggregated base station to send a corresponding security domain identifier to each of the plurality of centralized unit user plane (CU-UP) components of the disaggregated base station.

20. The apparatus of claim 17, wherein the at least one memory and the computer program code are configured to, with the at least one processor, cause a centralized unit control plane (CU-CP) component of the disaggregated base station to perform the computation of the plurality of sets of security keys.

21. A method comprising:
sending a reconfiguration message from a disaggregated base station in a communication system to user equipment with which the disaggregated base station has a current security context established, wherein the reconfiguration message comprises an instruction to the user equipment to compute a new security context for one of a plurality of security domains supported by the disaggregated base station based on a security domain counter value, wherein the security domain counter value is associated with said one of the plurality of security domains supported by the disaggregated base station; and
computing, at the disaggregated base station, the new security context for said one of the plurality of security domains based on the security domain counter value and a current default security context value for the disaggregated base station.

22. The method of claim 21, further comprising computing a plurality of sets of security keys respectively for the plurality of security domains, wherein computation of one of the plurality of sets of security keys for said one of the plurality of security domains is are based on the security domain counter value.

23. The method of claim 22, further comprising sending a different one of the plurality of sets of security keys respectively computed for the plurality of security domains to each of a plurality of centralized unit user plane (CU-UP) components of the disaggregated base station.

24. The method of claim 23, further comprising sending a corresponding security domain identifier to each of the plurality of centralized unit user plane (CU-UP) components of the disaggregated base station.

25. The method of claim 22, wherein the computation of the plurality of sets of security keys is performed by a centralized unit control plane (CU-CP) component of the disaggregated base station.

26. An article of manufacture comprising a non-transitory computer-readable storage medium having embodied therein executable program code that when executed by a processor operatively coupled to the computer-readable storage medium causes the processor to perform the steps of claim 21.

* * * * *